(12) United States Patent
Lee et al.

(10) Patent No.: US 8,591,251 B2
(45) Date of Patent: Nov. 26, 2013

(54) LIGHT EMITTING DIODE LIGHT BAR MODULE WITH ELECTRICAL CONNECTORS FORMED BY INJECTION MOLDING

(75) Inventors: Hsiao-Wen Lee, Hsinchu (TW); Chih-Hsuan Sun, Kaoshiung (TW); Wei-Yu Yeh, Tainan (TW)

(73) Assignee: TSMC Solid State Lighting Ltd., Hsin-Chu (TW)

( * ) Notice: Subject to any disclaimer, the term of this patent is extended or adjusted under 35 U.S.C. 154(b) by 0 days.

(21) Appl. No.: 13/557,315

(22) Filed: Jul. 25, 2012

(65) Prior Publication Data

US 2012/0287635 A1 Nov. 15, 2012

Related U.S. Application Data

(62) Division of application No. 12/899,999, filed on Oct. 7, 2010, now Pat. No. 8,257,110.

(51) Int. Cl.
*H01R 13/00* (2006.01)
(52) U.S. Cl.
USPC .......................................................... 439/487
(58) Field of Classification Search
USPC .......................................... 439/487; 361/704
See application file for complete search history.

(56) References Cited

U.S. PATENT DOCUMENTS

| | | | |
|---|---|---|---|
| 5,287,001 A * | 2/1994 | Buchmann et al. | ............ 257/719 |
| 5,376,587 A * | 12/1994 | Buchmann et al. | ............ 438/122 |
| 5,708,297 A | 1/1998 | Clayton | |
| 6,791,167 B2 | 9/2004 | Hayashi et al. | |
| 6,791,171 B2 | 9/2004 | Mok et al. | |
| 6,982,873 B2 | 1/2006 | Meyer et al. | |
| 7,187,548 B2 | 3/2007 | Meyer et al. | |
| 7,195,381 B2 * | 3/2007 | Lynam et al. | ................. 362/494 |
| 7,247,035 B2 | 7/2007 | Mok et al. | |
| 7,281,820 B2 * | 10/2007 | Bayat et al. | ................... 362/245 |
| 7,923,827 B2 | 4/2011 | Heng et al. | |

\* cited by examiner

*Primary Examiner* — Jean F Duverne
(74) *Attorney, Agent, or Firm* — Haynes and Boone, LLP

(57) ABSTRACT

The present disclosure relates to methods for fabricating electrical connectors of a waterproof connector-heat sink assembly of a LED light bar module using injection molding. The methods include matching the coefficient of thermal expansion (CTE) of injection molding materials for the connectors and heat sinks. A heat sink and conductor pins are inserted into an injection mold and the injection molding materials are injected into the injection mold. An integrated connector-heat sink assembly is formed when the injection molding materials of the connectors form a waterproof seal with the heat sink when the injection molding materials solidify. Placement of the heat sink and conductor pins inside the injection mold is controlled to ensure that adhesive bonding between the injection molding materials and the heat sink is stronger than a maximum shear force.

20 Claims, 4 Drawing Sheets

LIGHT EMITTING DIODE LIGHT BAR MODULE WITH ELECTRICAL CONNECTORS FORMED BY INJECTION MOLDING

PRIORITY DATA

This Divisional application claims priority to application Ser. No. 12/899,999, filed on Oct. 7, 2010, entitled "LIGHT EMITTING DIODE LIGHT BAR MODULE WITH ELECTRICAL CONNECTORS FORMED BY INJECTION MOLDING," the entire disclosure of which is incorporated herein by reference.

BACKGROUND

Light emitting diode (LED) light bar modules enclose LEDs that emit light when voltages are applied to the LEDs. LED light bar modules may include a heat sink to aid in heat dissipation and connectors that are attached to the heat sink for supplying power and controls to the LEDs. LED light bar modules are frequently used in outdoor applications such as street lighting and signage lighting. Thus, the connectors and heat sink are required to form a waterproof seal. To increase light output, two or more LED light bar modules may be connected in series through the connectors of the LED light bar modules. However, when plugging or unplugging the connectors to connect or disconnect the LED light bar modules, the connectors and the attached heat sink are subject to a shear force. Thus, the connector-heat sink assembly is additionally required to have a strength of adhesive bonding between the connectors and the heat sink that is strong enough to withstand the expected shear force. Conventionally, connectors are glued to heat sinks to achieve the waterproof seal and the adhesive bonding when assembling the LED light bar modules.

While methods of attaching connectors to heat sinks by gluing have been widely practiced, the performance of the connector-heat assemblies has not been entirely satisfactory. For example, environmental conditions such as changing temperatures and humidity may cause the glue in the connector-heat assemblies to peel or chip, degrading the integrity of the waterproof seal and the adhesive bonding between the connectors and the heat sinks. Furthermore, gluing connectors to heat sinks increases manufacturing complexity and cost for the LED light bar module assembly process. Accordingly, there is a need for methods of fabricating connector-heat sink assemblies that are capable of maintaining waterproof seal and adhesive bonding between connectors and heat sinks over environmental conditions while reducing manufacturing process and cost.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1B:
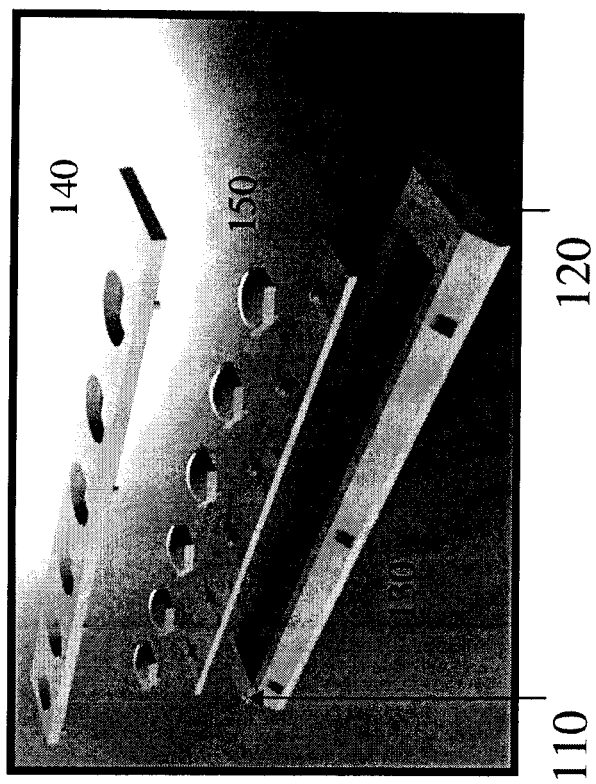
FIG. 1B shows an exploded view of the LED light bar module of FIG. 1A according to one or more embodiments of the present disclosure.

The present disclosure relates to methods for fabricating electrical connectors of a waterproof connector-heat sink assembly of a LED light bar module using injection molding. The connector-heat sink assembly including the injected molded connectors and the heat sink remain waterproof over all operating conditions and a life cycle of the LED light bar module, and are also resistant to strong shear force. It is understood that the present disclosure provides many different forms and embodiments, and that specific embodiments are provided only as examples. Further, the scope of the present disclosure will only be defined by the appended claims. In the drawings, the sizes and relative sizes of regions may be exaggerated for clarity. It will be understood that when an element is referred to as being "on," "connected to," or "coupled to" another element, it may be directly on, connected to, or coupled to the other element, or intervening elements may be present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may likewise be interpreted accordingly.

Hereinafter, embodiments of the present disclosure will be explained in detail with reference to the accompanying drawings.

Figure 1A:
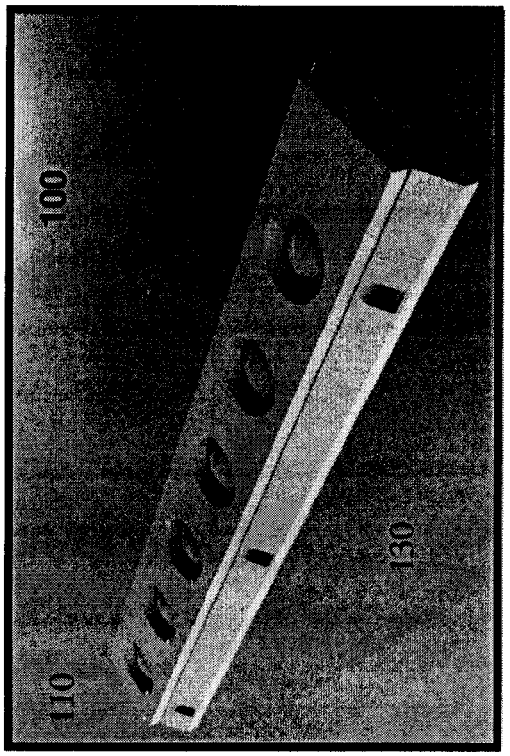
FIG. 1A shows a perspective view of an LED light bar module with injection molded connectors according to one or more embodiments of the present disclosure.

FIG. 1A shows a perspective view of an LED light bar module 100 with injection molded connectors according to one or more embodiments of the present disclosure. The LED light bar module 100 includes a male connector 110 and a female connector 120 disposed on two opposite ends of a heat sink 130. Heat sink 130 has a channel running down its longitudinal length with openings at the two opposite ends of the channel for the connectors. In the present embodiment, male connector 110 and female connector 120 are fabricated by an injection molding process using polybutylene terephthalate (PBT) filled with 30% glass fiber as the injection molding materials. Alternative embodiments of materials for the connectors include polycarbonate or other types of plastic. Also in the present embodiment, heat sink 130 is made from aluminum 6063-T5, an aluminum alloy. Alternative embodiments of materials for heat sink 130 include other metals having good thermal conductivity. Heat sink 130 aids in the dissipation of heat generated by LEDs housed inside LED light module 100.

Male connector 110 and female connector 120 serve as an inlet and an outlet for power and control signals to LED light bar module 100. In addition, two or more LED light bar modules 100 may be connected in series by plugging male connector 110 of a first LED light bar module 100 into female connector 120 of a second LED light bar module 100. The serially connected array of LED light bar modules 100 is used in applications requiring increased light output. Each LED light module 100 thus receives its power from either male connector 110 or female connector 120, and also passes power through the other connector to the next LED light module 100 in series.

Male connector 110, female connector 120, and heat sink 130 form a waterproof connector-heat sink assembly to keep away moisture and contaminants from the interior of LED light bar module 100. The waterproof seal is maintained over environmental conditions under which LED light bar module 100 is expected to operate. For example, if LED light module 100 is used for street lighting, the connector-heat sink assembly maintains the waterproof seal across variations in temperature, humidity, radiation, etc. under which the street lighting would operate. Thus, the PBT with 30% glass fiber of male connector 110 and female connector 120, and the aluminum 6063-T5 of heat sink 130 are chosen to have substantially the same coefficients of thermal expansion (CTE) to help maintain a waterproof seal across variations in environmental conditions. In addition, male connector 110 and female connector 120 need to adhere to heat sink 130 with an adhesive force that is strong enough to withstand a shear force the connector-heat sink assembly is subject to when one LED light bar modules 100 is plugged into or unplugged from another LED light bar module 100. Because the strength of adhesive bonding between male connector 110 or female connector 120 and heat sink 130 is a function of the contact surface area, male connector 110, female connector 120 are fabricated to have sufficient contact surface areas with heat sink 110.

The connector-heat sink assembly is attached to a housing 140 that runs longitudinally above the connector-heat sink assembly. In the present embodiment, housing 140 is glued to male connector 110, female connector 120, and heat sink 130. Alternative embodiments of attaching housing 140 to the connector-heat assembly include using screws. The connector-heat assembly and housing 140 enclose LEDs within LED light bar module 100. Housing 140 has an array of openings running longitudinally for placement of an array of LED lens 150 through which the enclosed LEDs emit light. In the present embodiment, LED lens 150 is made of epoxy. LED lens 150 shapes an emitted light pattern from the LEDs when power is applied to LED light bar module 100 through male connector 110 or female connector 120.

FIG. 1B shows an exploded view of the LED light bar module of FIG. 1A according to one or more embodiments of the present disclosure. Male connector 110, female connector 120, and heat sink 130 define an interior cavity of LED light bar module 100 for placing an LED PCB (printed-circuit board) 160. LED PCB 160 contains circuitry for driving the array of LEDs placed on the upward facing surface of LED PCB 160. LED PCB 160 is attached to heat sink 130 to provide a thermal conductive path through heat sink 130 for dissipating heat generated by the array of LEDs. In addition, LED PCB 160 connects to one of male connector 110 or female connector 120 to receive power and control signals for the array of LEDs. LED PCB 160 also connects to the other connector to pass the power and control signals to the next LED light bar module connected in series. An array LED lens 150 is placed over the array of LEDs to shape emission patterns and optionally bandwidths of emitted light from the LEDs. Housing 140 containing the array of openings for the array of LED lens 150 is attached over the top of LED light bar module 100.

Figure 2:
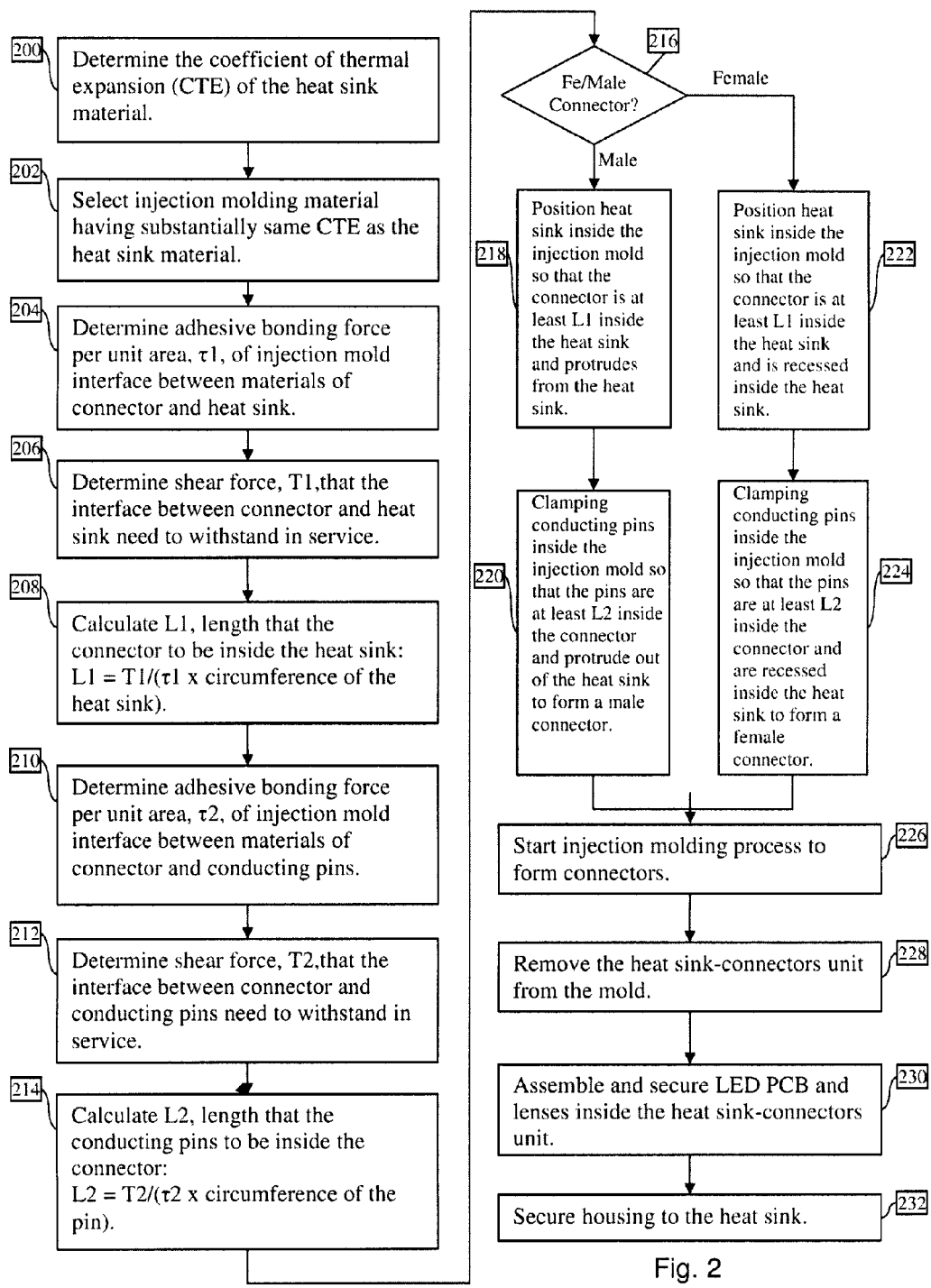
FIG. 2 shows a flowchart of a method for fabricating connectors of a waterproof connector-heat sink assembly of the LED light bar module of FIG. 1A using an injection molding process according to one or more embodiments of the present disclosure.

FIG. 2 shows a flowchart of a method for fabricating connectors of the waterproof connector-heat sink assembly of the LED light bar module of FIG. 1A using an injection molding process according to one or more embodiments of the present disclosure.

As discussed, the CTEs of materials used to fabricate male connector 110, female connector 120, and heat sink 130 need to be substantially the same to help maintain a waterproof seal across variations in environmental conditions. In particular, as temperature changes, male connector 110, female connector 120, and heat sink 130 expand or contract by substantially the same amount to help maintain the integrity of the waterproof seal.

In step 200, the CTE of heat sink 130 is determined when materials for heat sink 100 is chosen. In the present embodiment, aluminum 6063-T5 is chosen because it has good thermal conductivity, is lightweight, and has a CTE that is readily matched by plastic materials used for the connectors. For example, aluminum 6063-T5 has a CTE of 23.4 $\mu m/m$-° C. over a temperature range of 20-100° C.

In step 202, injection molding materials of the connectors are selected. Selection criteria for step 202 include, but are not limited to, materials that are suitable for the injection molding process, have good mechanical property, and have a CTE that is substantially the same as that of the heat sink material. In the present embodiment, PBT filled with 30% glass fiber is selected because it is suitable for use as an injection molding material, adheres to aluminum 6063-T5 of heat sink 100 to form a tight seal, and has a CTE of 23.4-25.2 $\mu m/m$-° C. over a temperature range of 60-138° C. Alternative embodiments include polycarbonate or other types of plastic materials.

In addition to the injection molding materials, male connector 110 and female connector 120 include connector pins to provide electrical connections. The connector pins are surrounded radially by the injection molding material. Therefore, consideration is also given to the CTE of the connector pins when evaluating the waterproof seal of the connector-heat sink assembly. However, due to the relatively small contact surface area between the connector pins and the injection molding materials, CTE matching between the connector pin and the injection molding materials is not critical for maintaining the integrity of the waterproof seal of the connectors. Therefore, there is more flexibility in selecting materials for the conductor pins. In the present embodiment, metal pins are made of copper surrounded by gold for their good conductive property.

As discussed, the strength of adhesive bonding between two surfaces is a function of the contact surface area between the two surfaces. In particular, the strength of adhesive bonding between male connector 110 or female connector 120 and heat sink 130 is a product of their contact surface area multiplied by the strength of adhesive bonding per unit area between the materials of male connector 110 or female connector 120 and heat sink 130. In addition, for the connector-heat sink assembly to withstand a maximum shear force when another connector is plugged into or unplugged from the connector-heat sink assembly, the strength of adhesive bonding between male connector 110 or female connector 120 and heat sink 130 has to be greater than the maximum shear force. Therefore, the contact surface area between male connector 110 or female connector 120 and heat sink 130 has to be sufficiently large to produce the required adhesive bonding strength. Similarly, the contact surface area between the conductor pins and male connector 110 or female connector 120 has to be sufficiently large.

In step 204, the strength of adhesive bonding per unit area, $\tau 1$, between the selected injection molding material and heat sink 130 is determined. In the present embodiment, $\tau 1$ is determined by running finite-element simulation of adhesive bonding between PBT filled with 30% glass fiber and aluminum 6063-T5. Alternative embodiments include conducting shear stress test on a connector-heat sink assembly having a known contact surface area to determine the minimum shear force necessary to break the adhesive bonding between the connector and the heat sink.

In step 206, the maximum shear force, T1, that the adhesive bonding between the selected injection molding material and heat sink 130 needs to withstand is determined. As discussed, the strength of adhesive bonding between the selected injection material of male connector 110 or female connector 120 and heat sink 130 has to be greater than T1 to maintain the integrity of the connector-heat sink assembly when T1 is applied.

In step 208, the length, L1, of the contact surface area between male connector 110 or female connector 120 and heat sink 130 is determined. L1 determines the minimum length by which connector 110 or female connector 120 makes contact with heat sink 130 in the longitudinal direction. L1 is determined by first dividing the maximum shear force T1 by $\tau 1$ to calculate the minimum required contact surface area between connector 110 or female connector 120 and heat sink 130. Connector 110 or female connector 120 makes contact with heat sink 130 along both the longitudinal direction of heat sink 130 and along a cross section of the channel of heat sink 130. Accordingly, the total contact surface area between connector 110 or female connector 120 and heat sink 130 is the product of the contact length in the longitudinal direction and c1, a cross sectional perimeter of the channel of heat sink 130. Therefore, once the minimum required contact surface area is determined, L1 is calculated by dividing the minimum required contact surface area by c1. The calculation for L1 may be expressed as:

$$L1=T1/(\tau 1 \times c1)$$

Similarly, in step 210, the strength of adhesive bonding per unit area, $\tau 2$, between the selected injection molding material and the conductor pins is determined. In the present embodiment, $\tau 2$ is determined by running finite-element simulation of adhesive bonding between PBT filled with 30% glass fiber and copper/gold. Alternative embodiments include conducting shear stress test on a connector having a known contact surface area between the injection molding material and the conductor pins to determine the minimum shear force necessary to break the adhesive bonding between the injection molding material and the conductor pins.

In step 212, the maximum shear force, T2, that the adhesive bonding between the selected injection molding material and the conductor pins needs to withstand is determined. The strength of adhesive bonding between the selected injection material of male connector 110 or female connector 120 and the conductor pins has to be greater than T2 to maintain the integrity of the connector when T2 is applied.

In step 214, the length, L2, of the contact surface area between the injection molding material of male connector 110 or female connector 120 and the conductor pins is determined. L2 determines the minimum length by which the conductor pins are seated in connector 110 or female connector 120 in the longitudinal direction of the connectors. L2 is determined by first dividing the maximum shear force T2 by $\tau 2$ to calculate the minimum required contact surface area between the injection molding material of connector 110 or female connector 120 and the conductor pins. Because the conductor pins are surrounded radially by the injection molding material, the total contact surface area between the conductor pins and the surrounding injection molding material is the product of the contact length in the longitudinal direction and a total circumference, c2, of the conductor pins. Therefore, once the minimum required contact surface area is determined, L2 is calculated by dividing the minimum required contact surface area by c2. The calculation for L2 may be expressed as:

$$L2=T2/(\tau 2 \times c2).$$

In step 216, a determination is made whether male connector 110 or female connector 120 is to be fabricated. If male connector 110 is to be fabricated, in step 218, an opening of the channel of heat sink 130 is placed inside an injection mold and positioned such that after the connector is fabricated by the injection molding process, the injection molding material of male connector 110 will contact the channel of heat sink 130 by a length of L1 in the longitudinal direction. In the present embodiment, the total longitudinal length of the injection molding material of male connector 110 is longer than L1 so that male connector 110 protrudes out of the edge of heat sink 130 through the opening of the channel.

In step 220, conductor pins for male connector 110 are clamped and positioned inside the injection mold to protrude from the edge of heat sink 130 through the opening of the channel. After male connector 110 is fabricated by the injection molding process, conductor pins will be seated in the injection molding material of male connector 110 by a length of L2 in the longitudinal direction.

If female connector 120 is to be fabricated, in step 222, an opening of the channel of heat sink 130 is similarly placed inside an injection mold and positioned such that after the connector is fabricated by the injection molding process, the injection molding material of female connector 120 will contact the channel of heat sink 130 by a length of L1 in the longitudinal direction. In the present embodiment, the total longitudinal length of the injection molding material of female connector 120 is L1. Therefore, female connector 120 will be recessed completely inside heat sink 130 with the edge of the injection molding material being coplanar with the edge of heat sink 130.

In step 224, connector pins for female connector 120 are clamped and positioned inside the injection mold to be recessed from the edge of heat sink 130. After female connector 120 is fabricated by the injection molding process, conductor pins will be seated in the injection molding material of female connector 120 by a length of L2 in the longitudinal direction.

Figure 3B:
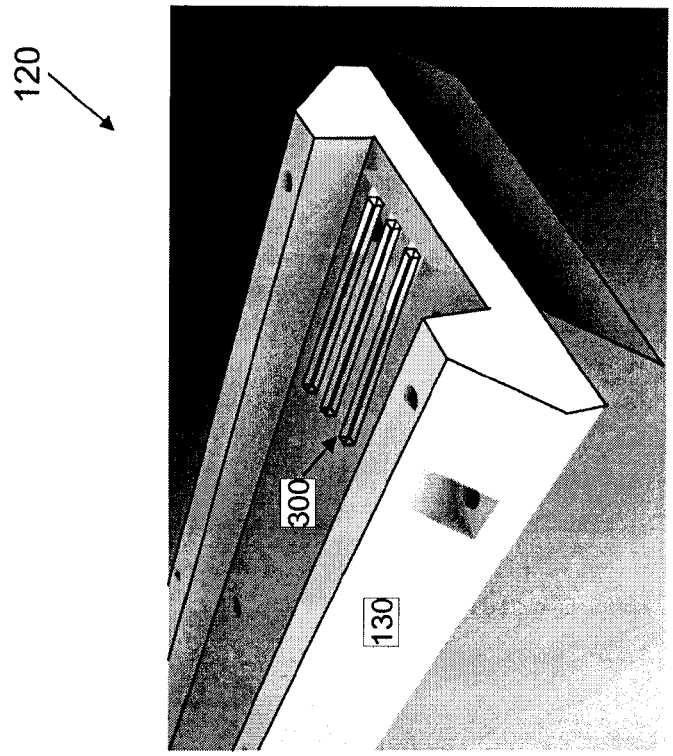
FIG. 3B shows a positioning of connector pins relative to the heat sink for fabricating a female connector using the method of FIG. 2 according to one or more embodiments of the present disclosure.
Figure 3A:
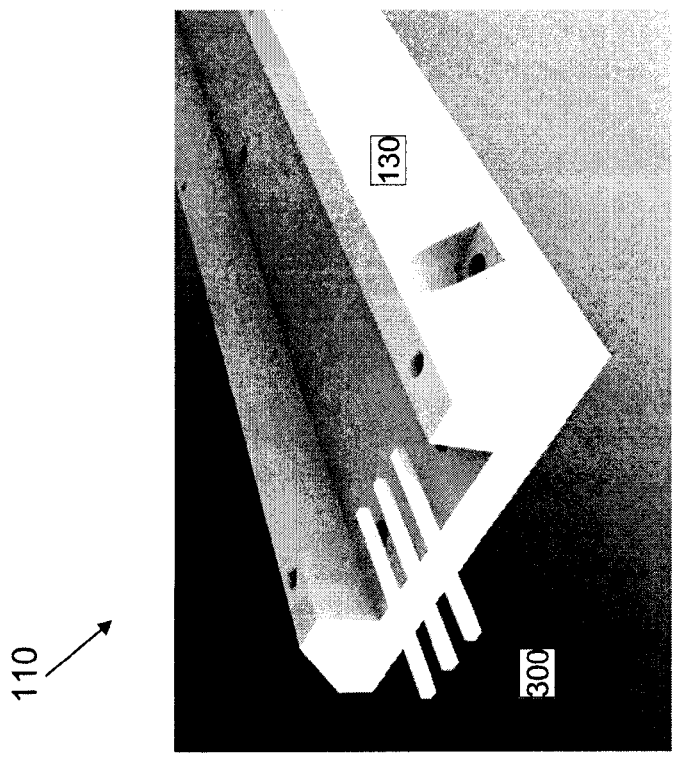
FIG. 3A shows a positioning of conductor pins relative to the heat sink for fabricating a male connector using the method of FIG. 2 according to one or more embodiments of the present disclosure.

FIG. 3A shows a positioning of conductor pins 300 relative to heat sink 130 for fabricating a male connector 110 using the method of FIG. 2 according to one or more embodiments of the present disclosure. As explained in step 220, conductor pins 300 are positioned to protrude from the edge of heat sink 130 through the opening of the channel.

FIG. 3B shows a positioning of connector pins 300 relative to heat sink 130 for fabricating a female connector 120 using the method of FIG. 2 according to one or more embodiments of the present disclosure. As explained in step 240, conductor pins 300 are positioned to be recessed from the edge of heat sink 130.

Returning to FIG. 2, in step 226, a molten state of the injection molding material selected in step 202 is injected into the injection mold in an injection molding process to fabricate male connector 110 or female connector 120. Alternative embodiments include using an injection mold to fabricate both male connector 110 and female connector 120 in a single injection process. In the present embodiment, PBT with 30% glass fiber is injected into the injection mold under a processing temperature of between 180 and 200 degrees Celsius.

Figures 4A, 4B:
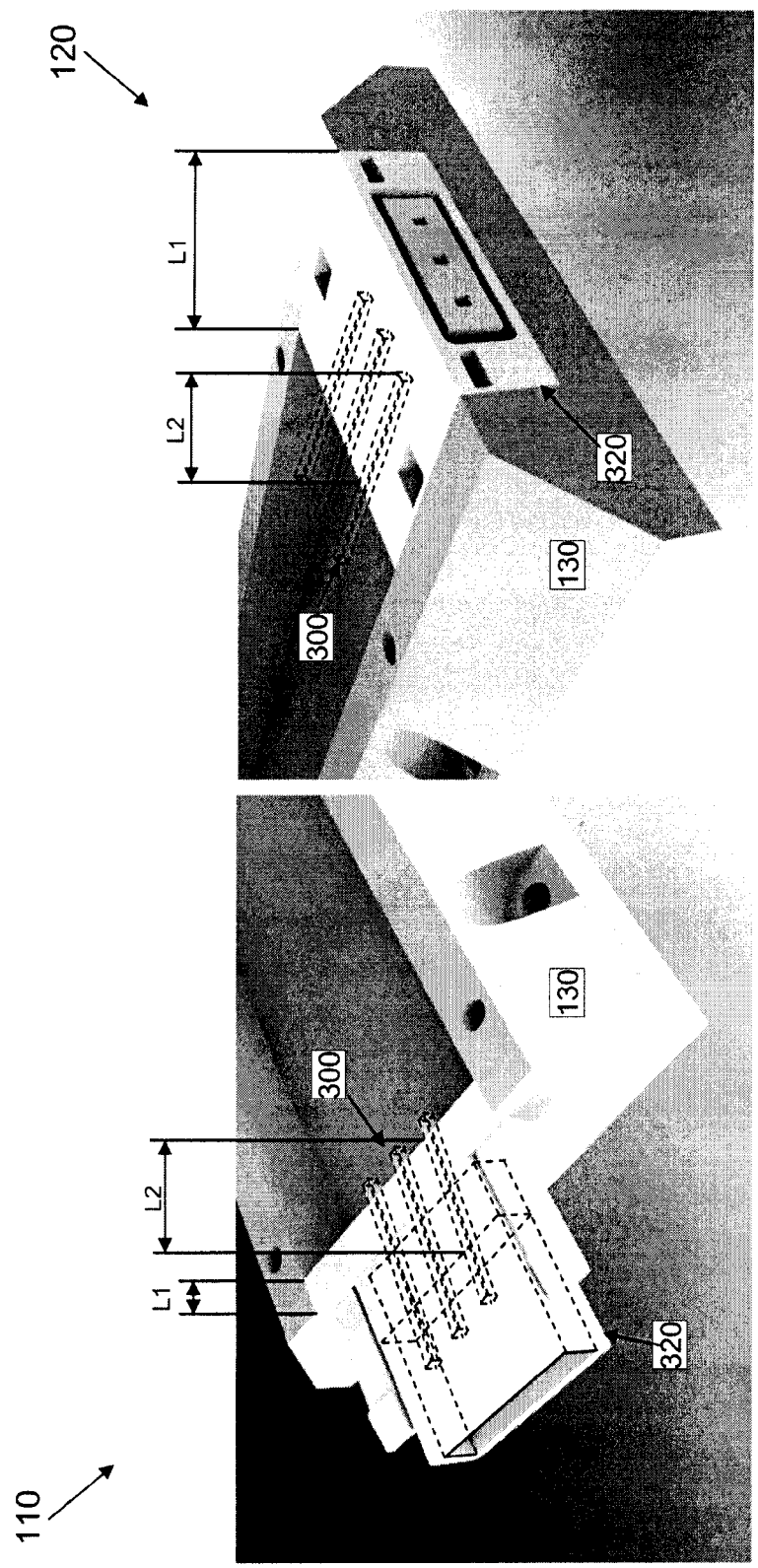
FIG. 4A shows a position of an injected molded male connector relative to the heat sink fabricated using the method of FIG. 2 according to one or more embodiments of the present disclosure.
FIG. 4B shows a position of an injected molded female connector relative to the heat sink fabricated using the method of FIG. 2 according to one or more embodiments of the present disclosure.

FIG. 4A shows a position of an injected molded male connector 110 relative to heat sink 130 fabricated using the method of FIG. 2 according to one or more embodiments of the present disclosure. Male connector 110 includes injection molding material 320 and conductor pins 300. Injection molding material 320 protrudes out of the edge of heat sink 130 through the opening of the channel. Injection molding material 320 also contacts the channel of heat sink 130 by a length of L1 in the longitudinal direction. Conductor pins 300 also protrude from the edge of heat sink 130 through the opening of the channel and are seated in injection molding material 320 by a length of L2 in the longitudinal direction.

FIG. 4B shows a position of an injected molded female connector 120 relative to heat sink 130 fabricated using the method of FIG. 2 according to one or more embodiments of the present disclosure. Female connector 120 also includes injection molding material 320 and conductor pins 300. Injection molding material 320 of longitudinal length L1 is recessed completely inside heat sink 130 with the edge of the injection molding material 320 being coplanar with the edge of heat sink 130. In addition, conductor pins 300 are recessed from the edge of heat sink 130 and are seated in injection molding material 320 by a length of L2 in the longitudinal direction.

Returning to FIG. 2, in step 228, the integrated connector-heat sink assembly including male connector 110, female connector 120, and heat sink 130 is removed from the injection mold. In step 230, LED PCB 160 containing an array of LEDs is placed inside the cavity of the connector-heat sink assembly. LED PCB 160 is also connected to male connector 110 and female connector 120 to receive power and control signals for the array of LEDs. An array of LED lens 150 is secured over the array of LEDs to shape emission patterns and optionally bandwidths of emitted light from the LEDs. In step 232, housing 140 containing an array of openings for array of LED lens 150 is attached over the top to enclose LED light bar module 100.

In accordance with one or more embodiments of the present disclosure, a method for forming an electrical connector of an LED light bar module is disclosed. The method includes determining the coefficient of thermal expansion (CTE) of materials of a heat sink. The heat sink has a channel with an opening. The method also includes selecting injection molding materials to have a CTE that is substantially the same as the CTE of the heat sink materials. The method further includes placing the opening of the heat sink channel into an injection mold. The method further includes clamping conductor pins into the injection mold at the opening of the heat sink channel. The method further includes injecting the injection molding materials in molten state into the injection mold to fill cavities between the conductor pins and the heat sink. The method further includes allowing the injection molding materials to solidify inside the injection mold to form the electrical connector. The electrical connector includes the injection molding materials and the conductor pins that are surrounded radially by the injection molding materials. The method further includes removing the electrical connector and the heat sink from the injection mold.

In accordance with one or more embodiments of the present disclosure, a method for forming an electrical connector of an LED light bar module is disclosed. The method includes selecting a heat sink. The heat sink has a channel with an opening. The method also includes selecting injection molding materials that are waterproof. The method further includes placing the opening of the heat sink channel into an injection mold. The method further includes clamping conductor pins into the injection mold at the opening of the heat sink channel. The method further includes injecting the injection molding materials in molten state into the injection mold to fill cavities between the conductor pins and the heat sink to form the electrical connector. The electrical connector includes the injection molding materials and the conductor pins that are surrounded radially by the injection molding materials. The method further includes forming a waterproof seal between the injection molding materials and the heat sink channel by allowing the injection molding materials to solidify. The method further includes removing the electrical connector and the heat sink from the injection mold.

In accordance with one or more embodiments of the present disclosure, a connector-heat sink apparatus of a light emitting diode (LED) light bar module is disclosed. The apparatus includes a heat sink. The heat sink has a channel with an opening. The apparatus also includes a connector placed in the heat sink channel to form a waterproof seal with the heat sink channel. The connector includes injection molding materials and a set of conductor pins surrounded radially by the injection molding materials. The connector is formed by an injection molding process.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

We claim:

1. A light-emitting diode (LED) module, comprising:
   a plurality of LED dies configured to emit light;
   a heat sink thermally coupled to the plurality of LED dies;
   a trench extending from a first end of the heat sink to a second end of the heat sink opposite the first end; and
   a connector disposed at one of the first and second ends of the trench, the connector including a plurality of conductive pins surrounded by an injection molding material.

2. The LED module of claim 1, wherein the connector is a first connector, and wherein the LED module further comprises a second connector disposed at one of the first and second ends opposite from the first connector, the second connector being configured to mate with the first connector.

3. The LED module of claim 2, wherein the one of the first and second connectors is a male connector, and the other one of the first and second connectors is a female connector that contains a plurality of cavities that each correspond to a respective one of the pins of the male connector.

4. The LED module of claim 3, wherein:
the male connector protrudes out of the heat sink;
the female connector is approximately flush with the heat sink; and
the male and female connectors are coupled to the heat sink in a glue-free manner.

5. The LED module of claim 1, wherein the injection molding material and the heat sink have substantially similar coefficients of thermal expansion (CTE).

6. The LED module of claim 5, wherein:
the heat sink contains aluminum; and
the injection molding material contains polybutylene terephthalate (PBT) and glass fiber.

7. The LED module of claim 1, wherein the connector occupies one of the first and second ends of the trench in a manner that it forms a waterproof seal for the trench.

8. The LED module of claim 1, further comprising:
a printed circuit board (PCB) disposed in the trench, wherein the plurality of LED dies are disposed on the PCB;
a plurality of lenses each covering a respective one of the LED dies; and
a housing disposed over the PCB, the housing containing a plurality of openings that each expose a respective one of the lenses.

9. The LED module of claim 1, wherein:
the heat sink includes an elongate bar; and
the trench has a substantially rectangular cross-sectional profile.

10. A lighting module, comprising:
a heat sink extending in a longitudinal direction;
a recessed channel running through the heat sink along the longitudinal direction;
a printed circuit board (PCB) located in the recessed channel;
a plurality of light-emitting diode (LED) dies located on the PCB;
a male connector located in the recessed channel and coupled to a first end of the PCB, wherein the male connector includes a set of conductive pins circumferentially surrounded by a first injection molding element; and
a female connector located in the recessed channel and coupled to a second end of the PCB opposite the first end, wherein the female connector includes a component containing a set of holes, wherein each of the holes is configured to mate with a respective one of the conductive pins of the male connector, and wherein the component is circumferentially surrounded by a second injection molding element.

11. The lighting module of claim 10, wherein:
the male connector protrudes out of the heat sink in the longitudinal direction; and
the female connector is flush with the heat sink in the longitudinal direction.

12. The lighting module of claim 10, wherein:
the heat sink has a first coefficient of thermal expansion (CTE);
the first and second injection molding elements each have a second CTE; and
the first CTE is approximately equal to the second CTE.

13. The lighting module of claim 10, wherein:
the heat sink contains aluminum 6063-T5; and
the first and second injection molding elements each contain polybutylene terephthalate (PBT) filled with 30% glass fiber.

14. The lighting module of claim 10, wherein the first and second injection molding elements seal the recessed channel in a waterproof manner.

15. The lighting module of claim 10, further comprising:
a plurality of lenses located over the PCB and each covering a respective one of the LED dies; and
a housing disposed over the PCB, the housing containing a plurality of openings that each expose a respective one of the lenses.

16. The lighting module of claim 10, wherein the male and female connectors are coupled to the heat sink without glue.

17. A connector-heat sink apparatus of a light emitting diode (LED) light bar module comprising:
a plurality of LED dies configured to emit radiation;
a heat sink having a channel with an opening, the heat sink being thermally coupled to the plurality of LED dies and providing heat dissipation for the LED dies; and
an injection-molded connector disposed in the opening of the channel to form a waterproof seal with the channel of the heat sink, wherein the injection-molded connector includes injection molding materials and a set of conductor pins surrounded radially by the injection molding materials.

18. The connector-heat sink apparatus of claim 17, wherein the injection molding materials have a coefficient of thermal expansion (CTE) that is substantially the same as the CTE of the heat sink.

19. The connector-heat sink apparatus of claim 17, wherein the injection molding materials are polybutylene terephthalate (PBT) filled with 30% glass fiber and the heat sink is made from aluminum 6063.

20. The connector-heat sink apparatus of claim 17, wherein a product of a contact surface area between the injection molding materials and the channel of the heat sink multiplied by a strength of adhesive bonding per unit area between the injection molding materials and the channel of the heat sink is greater than a maximum shear force that the connector-heat sink apparatus needs to withstand.

* * * * *